May 7, 1963 H. J. WICHMANN ETAL 3,088,387
LIGHTMETER WITH FOLLOWER ELEMENT
Filed March 1, 1960
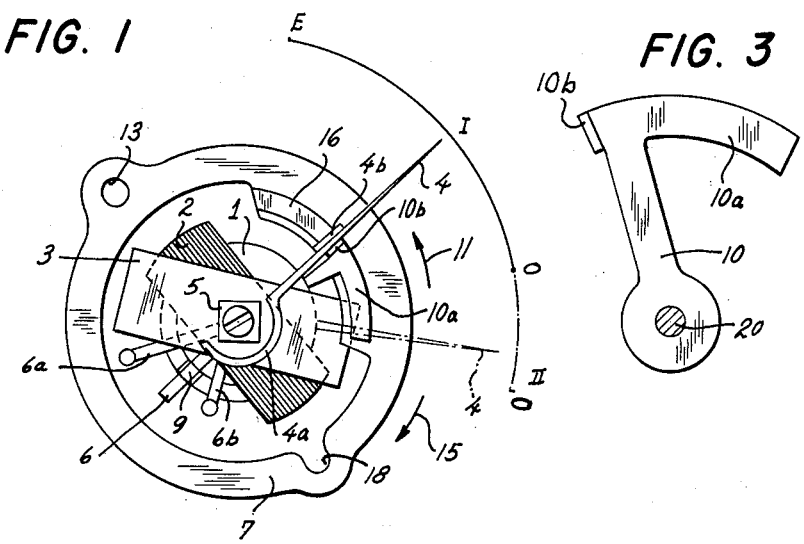
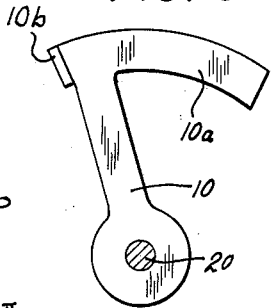
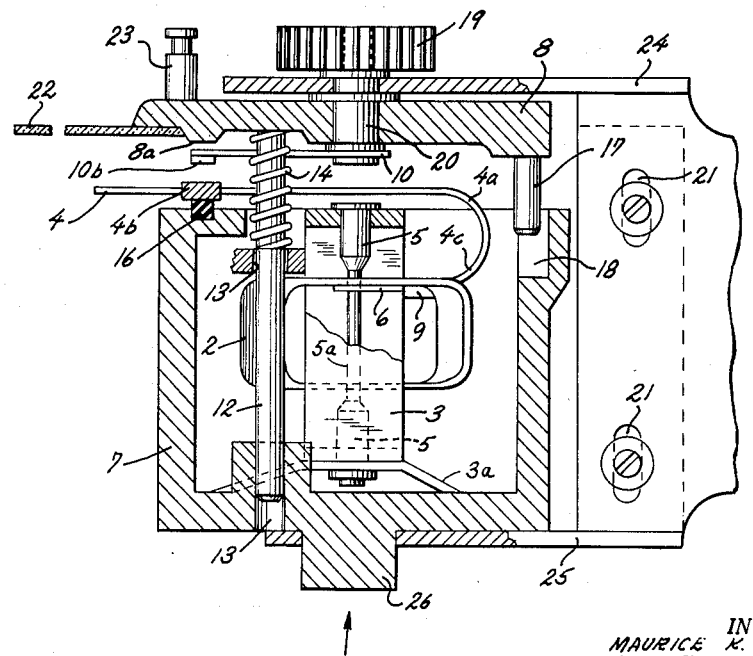
INVENTOR.
MAURICE K. CARR
HANS JOACHIM WICHMANN
ALFRED AHLES
ELSBETH SCHORR
BY
ATTORNEY

United States Patent Office 3,088,387
Patented May 7, 1963

3,088,387
LIGHTMETER WITH FOLLOWER ELEMENT
Hans Joachim Wichmann, Alfred Ahles, and Elsbeth Schorr, Nurnberg, Germany, and Maurice K. Carr, Ann Arbor, Mich., assignors, by mesne assignments, to Arqus Incorporated, a corporation of Delaware
Filed Mar. 1, 1960, Ser. No. 12,110
3 Claims. (Cl. 95—10)

The invention refers to an electric lightmeter which can be coupled to shutter adjusting elements of still or movie cameras whose correct exposure is automatically controlled by the travel of a follower element which is coupled to the aperture or speed setting means and which moves toward a stop consisting of the clamp-arrested instrument pointer.

Known systems of this kind usually operate in a manner that when actuating the release, the instrument pointer is clamped in a position appropriate to the brightness of the selected object and that a follower element moves toward a stop on the instrument pointer whereby the aperture or shutter speed is adjusted accordingly. The instrument pointer travel from its lowest light value to the highest value then i.e. corresponds to the travel of the aperture setting means from its largest to the smallest opening. Therefore, at low light values the follower element moves only a small amount because of the small pointer movement and the aperture remains wide open. The reverse takes place at high light values. On cameras which are compensated for different film or shutter speeds by rotating or shifting the instrument, the undesirable condition can occur that when rotating the instrument, i.e. to a higher film speed setting, the instrument pointer, which is deflected only a little at low light values, appears in a position behind the leading edge (stopping edge) of the follower element (at wide open aperture). Under poor light conditions, therefore, the follower element, without the limiting stop given by the instrument pointer, would travel through the entire adjustment range to a position representing the smallest aperture. This would result in an entirely wrong exposure.

According to the invention, this disadvantage is avoided by providing the follower element with a preferably flag-like extension which extends in a direction opposite the direction of follower element travel. The shape of this extension is such that it is clamped together with the instrument pointer upon actuating the release whenever the instrument pointer is outside the scanning range of the follower element. Thus, under poor light conditions and if a relatively slow film speed was selected i.e. by rotating the entire instrument housing (or the instrument only) no aperture adjustment in direction of a smaller aperture is possible when releasing the mechanism since the follower element is restricted from traveling through its scanning range by the clamping action.

A further characteristic of the invention is the fact that the lightmeter housing consists of two parts which are movable relative to each other against a spring force.

Of special significance in the invention is the provision of a clamping segment made of a rubber-soft, age-resistant material which is mounted on the face of one of the housing parts within the scanning range of the instrument pointer, respectively the follower element. This clamping segment can also be provided on the opposing faces of the two housing parts and could, i.e. be cemented, vulcanized or recessed in a groove.

Furthermore, according to the invention, the housing holding the instrument is mounted rotatably about the instrument axis in a yoke consisting of two parts, whereby for better adjustability and ease of assembly, the yoke is formed of two axially movable parts.

In the following, the invention is described in more detail by means of an example and in drawings:

FIGURE 1 shows the light meter with the top section removed;

FIGURE 2 shows a cross section through the light meter whereby elements which are of minor importance to the invention have been eliminated to give a clearer view;

FIGURE 3 shows an enlarged view of the follower element.

As shown in FIGURE 1, the instrument consists in a conventional manner of a core magnet 1, a moving coil 2 having a central staff 5a pivoted in bearing screws 5 supported in a soft iron enclosure 3. The iron enclosure 3 is supported on bracket 3a which is, in turn, secured by means (not shown) to the lower end of the instrument housing 7. The instrument pointer 4 extends over the circumference of the housing and can be made visible in any suitable manner, i.e. in the camera viewfinder. To provide sufficient freedom of movement for the instrument pointer, especially with respect to bearing screw 5, the pointer forms an arc at point 4a. A three-ended mounting part 6 has been provided to facilitate assembly. The mounting part includes a central extension to the end of which the pointer is secured and two other extensions having the tabs 6a and 6b on their ends. This part is mounted on the frame portion of moving coil 2 which, after inserting the instrument into the housing is equipped with the pointer 4 by means of a clamp 9. The two tabs 6a and 6b of the mounting part 6 serve in a conventional manner for balancing the moving parts of the system including the pointer and the coil.

FIGURE 2 shows a cross section of the shutter-coupled light meter. The two tabs, or ends, 6a and 6b of the three-ended mounting part 6, referred to above, are not shown in FIG. 2 to avoid complication of the essential features shown therein. The housing consists of the pot like lower section 7 and the top section 8 whereby the lower section 7 houses the instruments 1 to 5. The follower element 10 is rotatably mounted in the top section 8 permanently coupled with the external pinion 19 via shaft 20. To avoid sliding friction and to stay clear of the clamping surface, the follower element is preferably spring loaded in the direction of its axis away from the surface of the top section 8. The automatically setting shutter element, i.e. the diaphragm, is connected with pinion 19. The two housing parts 7, 8 are movably connected to each other by pin 12. Pin 12 is rigidly mounted in top section 8 and glides in holes 13. To prevent rotation of the two housing parts 7, 8 with respect to each other, a short guide pin 17 is mounted in top section 8 and glides in groove 18. The pressure of spring 14 pushes the two housing parts always away from each other.

Operation of the shown system is as follows:

First, one or more exposure factors, i.e. shutter speed, film speed or frames per second are taken into consideration by rotating the instrument—in this case the entire housing. The appropriate transmitting element (not shown) is connected to pin 23 on top section 8. Rotation of the housing is made possible by mounting it in a yoke 24, 25 with pivots formed by shaft 20 at one end and pin 26 on lower section 7 at the other end.

To simplify assembly and adjustments after completion, the yoke is formed of two parts 24, 25 which are bolted together in proper position by means of the elongated holes 21 after both the top and lower sections have been completed separately.

At the start of the movement of the follower element. the lower section 7 is pressed against the top section 8 whereby the guide pin 17 and the spring loaded pin 12 are shifted in their respective bearings 13, 18. The movement of the lower section 7 toward the upper section 8 is obtained by force of a pressure member (not shown) acting in the direction of the arrow shown below the pin 26 in FIG. 2. Thus, as may be seen from the drawing, the upper section 8, the yoke arms 24 and 25 and the pins 12 and 17 remain stationary as the lower section 7 is raised, the pin 26 sliding axially in its bearing in yoke arm 25. The compression spring 14 returns the mechanism to its starting position after the exposure i.e. after the pressure member permits the lower section to move into its normal position against yoke arm 25. Pressing the two housing parts together arrests pointer 4. For that purpose the pointer is equipped with a shoe 4b which presses against the clamping segment 16 thus forcing the pointer 4 to rest against face 8a of top section 8. The clamping segment 16 secured in a groove on the upper surface of lower housing part 7 is made of a soft, rubber-like material, preferably silicone rubber whose frictional aging and compressibility properties even under tropical conditions make it especially suitable for this application. The pointer has been equipped with an elastic section 4c in order to avoid any excess stress on pointer 4 and frame 5 by the clamping action.

Two basic starting positions, depending on the light conditions and the preselected exposure factors, are possible when operating the camera with the new coupled light meter. They are described as follows: Position I represents the normal situation with adequate light for an exposure and position II represents the extreme situation where the light is insufficient for automatic operation of the camera and where an automatic setting of either diaphragm opening or shutter speed must be avoided.

With the instrument pointer 4 i.e. in position I, the follower element 10, upon leaving its starting position, will travel from its starting position in direction of arrow 11 (FIGURE 1) through its scanning range until its leading edge 10b touches the clamped instrument pointer 4 and thereby ends the diaphragm adjustment coupled with this movement. The maximum angle or travel of follower element 10 is given by the maximum opening of the diaphragm, therefore it is in a sense in a fixed position in relation to the instrument pointer 4 of the moving instrument. If now the housing 7, 8 is rotated i.e. to compensate for film speed, specifically in direction of arrow 15 (as shown by position II) and if only a relatively low light value is indicated, then the leading edge 10b of follower element 10 is already past the instrument pointer (in broken lines) at the start of its travel and it will travel all the way to the position for the smallest aperture since no restrictions are in its path.

The flag-like extension 10a of follower element 10 (FIGURE 3) provided according to the invention, avoids a faulty exposure in such a situation in which the pointer is outside the path of travel of the leading edge 10b of the follower, since upon release, the extension 10a of follower element 10 is clamped between face 8a of section 8 and clamping segment 16 on lower section 7 of the device (position II) together with the instrument pointer 4; therefore, the diaphragm cannot close. Warning covers 22 mounted on the top section 8 are provided for these adjustment ranges in order to improve recognition of poor exposure conditions i.e. low brightness of object by the user. For special applications it might be desirable to make these covers 22 transparent and perhaps tinted instead of opaque to make the pointer underneath always visible. These warning covers 22, together with pointer 4, can be arranged in a way to make them visible in the viewfinder.

We claim:
1. In automatic exposure control mechanism for a camera provided with a light measuring meter having a swingable indicator element, means for arresting the element in the measured light position, a rotatable follower driven in the same direction as said indicator element by exposure determining means in the camera, said indicator element when arrested serving as a stop to arrest the follower in exposure taking light position, and means rotatable with said follower of such arcuate extent relative to the path of said indicator element travel that under low measured light conditions that are excessively low for automatic exposure control action of said mechanism said follower will be held against movement in said direction when the indicator element is arrested.

2. Control mechanism for a camera or the like comprising a light meter assembly having axially relatively movable parts with an armature mounted indicating pointer extending radially into the space between them, an exposure light determining follower pivoted on the axis of said meter and extending radially into said space, means mounting said meter assembly for adjustment about its said axis, means for relatively moving said parts to arrest the pointer in measured light position so that the pointer may normally serve as a stop limiting rotation of said follower in one direction, said follower including a portion of such arcuate extent relative to the path of pointer travel that it will underlie and be held against movement along with the pointer during excessively low measured light conditions.

3. Exposure control mechanism for a camera comprising a support member, a first housing part for a meter movement rotatably mounted about an axis with respect to said support member, a light meter movement supported in said first housing part and having a pointer rotatable about said axis from a starting point of the pointer rotation through an angle related to a flow of electric current through the meter movement, said first housing part having a first clamping surface adjacent said pointer, a second housing part having a second clamping surface parallel to said first clamping surface and on the opposite side of the path of rotation of said pointer from the first clamping surface, a pointer follower pivotally mounted on the second housing part for rotation about said axis in a plane intermediate the plane of rotation of the pointer and the second clamping surface, said follower having a leading edge and a trailing portion, means for advancing the first housing part toward the second housing part thereby to provide holding of the pointer between the clamping surfaces and also holding of the follower between the pointer and the second clamping surface should the pointer be adjacent the trailing portion of the follower when said first housing part is advanced and means operable subsequent to said last mentioned means for rotating said follower until its leading edge abuts the clamped pointer unless such rotation is prevented by the aforesaid clamping of the trailing portion.

References Cited in the file of this patent
UNITED STATES PATENTS

| | | |
|---|---|---|
| 2,188,820 | Riszdorfer | Jan. 30, 1940 |
| 2,206,626 | Blechner | July 2, 1940 |
| 2,250,898 | Tonnies | July 29, 1941 |
| 2,930,282 | Herterich | Mar. 29, 1960 |
| 2,940,046 | Heterich | June 7, 1960 |